(12) United States Patent
Ellman

(10) Patent No.: US 9,307,074 B1
(45) Date of Patent: Apr. 5, 2016

(54) INFORMATION TRANSMISSION DEVICE AND SYSTEM

(71) Applicant: Alan Ellman, Hewlett, NY (US)

(72) Inventor: Alan Ellman, Hewlett, NY (US)

(*) Notice: Subject to any disclaimer, the term of this patent is extended or adjusted under 35 U.S.C. 154(b) by 0 days.

(21) Appl. No.: 14/662,177

(22) Filed: Mar. 18, 2015

Related U.S. Application Data

(60) Provisional application No. 61/955,744, filed on Mar. 19, 2014.

(51) Int. Cl.
*H04M 1/56* (2006.01)
*H04M 15/08* (2006.01)
*H04M 3/42* (2006.01)

(52) U.S. Cl.
CPC ...... *H04M 3/42068* (2013.01); *H04M 3/42161* (2013.01)

(58) Field of Classification Search
CPC ............... H04M 3/42042; H04M 3/42068; H04M 3/42093; H04M 7/0012; H04M 7/006; H04M 15/06; H04M 2201/38; H04M 2203/6009; H04M 2203/665; H04L 29/06; H04L 29/06027; H04L 29/12094; H04L 61/1529; H04L 65/1069; H04W 12/08
USPC ............ 379/142.01, 142.02, 142.04, 142.05, 379/142.06, 142.17, 211.01, 211.02, 142.09
See application file for complete search history.

(56) References Cited

U.S. PATENT DOCUMENTS

| | | | | |
|---|---|---|---|---|
| 7,945,253 B2* | 5/2011 | Zellner | ............. | H04M 3/42042 379/142.01 |
| 8,537,994 B2* | 9/2013 | Hillier | ................... | H04W 12/08 379/142.01 |
| 8,553,854 B1* | 10/2013 | Weaver | ............... | H04M 3/2281 379/100.05 |
| 8,553,864 B2* | 10/2013 | Chatterjee | ......... | H04M 3/42068 379/142.01 |
| 8,681,958 B2* | 3/2014 | Chatterjee | ......... | H04M 3/42059 379/142.06 |
| 8,848,886 B2* | 9/2014 | Toner | ................ | H04M 3/42068 379/93.23 |
| 2002/0067812 A1* | 6/2002 | Fellingham | ............. | H04M 1/56 379/93.25 |
| 2005/0100150 A1* | 5/2005 | Dhara | ..................... | H04L 29/06 379/142.01 |
| 2008/0152097 A1* | 6/2008 | Kent | ....................... | H04L 12/66 379/93.01 |
| 2013/0034220 A1* | 2/2013 | Ozeri | .................... | H04M 15/06 379/142.06 |
| 2014/0334616 A1* | 11/2014 | Jeong | .................... | H04M 1/576 379/142.04 |

* cited by examiner

*Primary Examiner* — Binh Tieu

(57) ABSTRACT

A computer implemented method includes making a phone call from a sender to a receiver and providing a non-audio identifier to the receiver in a phone call signal of the phone call. The non-audio identifier provides access to information of the sender by the receiver.

10 Claims, 4 Drawing Sheets

INFORMATION TRANSMISSION DEVICE AND SYSTEM

RELATED APPLICATIONS

This Application claims priority to Provisional Patent Application No. 61/955,744, the entirety of which is incorporated herein by reference.

BACKGROUND

Presently, callers making calls to or receiving calls from another caller, through an electronic means such as a telephone, text message or SMS message, are often required to enter or provide information manually. For example, when calling a travel agency, a caller must often provide information over the phone including name, address, frequent-flier number, seating preferences, meal preferences, dates of desired travel, passport information and other information. Likewise, when calling their doctor, a caller must often provide (in person or over the phone) information such as allergy, medication, medical history, x-rays, and MRIs and other such information. When ordering a product online or over the phone, a caller is often required to provide billing and shipping information. Providing information in this way may be tedious as the caller is obligated to have information such as credit card numbers, account numbers, medical information, hotel preferences or other not readily available information on hand when making such transaction. In an attempt to remedy this situation, companies such as Amazon.com and others provide a caller or user with the ability to create an account or otherwise store information such that it can be accessed in future transactions. For example, when entering a airline site, a user can login and access their own billing information frequent-flier numbers. Likewise, when a user uses Amazon.com, they can similarly log into Amazon's website and use the information stored thereon such as billing and shipping information.

While such systems do provide an advantageous solution to the manual entry of tedious information, this information is locally stored at the recipient and is not available to the caller for calls initiated to different parties and the information is not unique to or travel with the caller. It is instead in the purview of the recipient company such as Amazon or others. As such, when contacting an individual or company for the first time, the information has to once again be reentered or provided manually. Moreover, the recipient alone is in control of that information. Lastly, this system does not resolve issues associated with first-time caller such as telemarketers who want to provide information to a recipient or permit the recipient to access information, such as product brochures or literature or to execute quick and easy payment options.

SUMMARY OF THE INVENTION

A computer implemented method includes making a phone call from a sender to a receiver and providing a non-audio identifier to the receiver in a phone call signal of the phone call. The non-audio identifier provides access to information of the sender by the receiver.

DETAILED DESCRIPTION OF PREFERRED EMBODIMENTS

Figure 1:
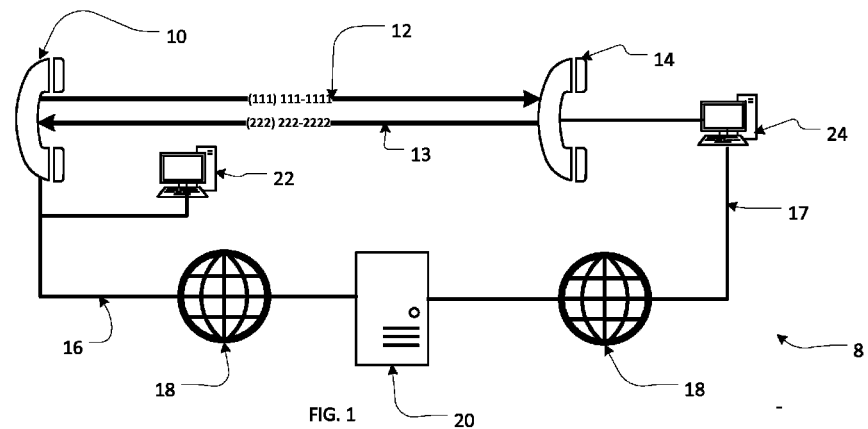
FIG. 1 is a schematic view of an information transmission device and system according to an aspect of the invention.

Referring now to FIG. 1, a system 8 according to one aspect of the present invention is shown and described. System 8 generally includes a telephone or caller 10 and another telephone or caller 14. It will be understood that caller 10 and caller 14 are used in a broad sense such that they may include a telephone, smart phone or individual actually making a call as well as a computer initiating communication, text or SMS message. In FIG. 1, caller 10 is connected to caller 14 through a communication line or other wired or wireless network. Such connection may occur through standard telephonic or voice over IP or other network connections. In the presently described example, caller 10 is transmitting a caller identifier 12 to caller 14. Likewise, caller 14 is transmitting a caller identifier 13 to caller 10. The aforementioned caller identifiers will be described in greater detail.

Caller 10 and caller 14 are each respectively connected to computer 22 and computer 24. Computer 22 and computer 24 may be any form of computer including a simplistic modem or other more advanced computer such as a PC or server. In one example, computer 22 modulates (or other known means of transmitting digital or analog information) information received by caller 10 from caller 14, such as caller identifier 13, and transmits this information through Internet 18 to server 20. Likewise, computer 22 receives information from server 20, through Internet 18, through network connection 16. Computer 22 and computer 24 may be standalone computers from respective caller 10 and caller 14 or may be integrated with caller 10 and caller 14 such as when Incorporated in a smart phone. Computer 24 modulates information received from caller 14, such as caller identifier 12, and transmits caller identifier 12 through network connection 17 to Internet 18 and subsequently to server 20. Likewise, computer 24 receives information from server 20, through Internet 18, and through network connection 17.

It will be noted that although Internet 18 is shown and described, one will readily understand that Internet 18 may be replaced with any hardwired or wireless network. Likewise, it will be noted that computer 22 and computer 24 may be a component of caller 10 or caller 14 such as a processor and memory configuration provided in a smart phone. Computer 22 and 24 may also be a standalone system or cloud based system. The term "caller" will be understood to include any telephonic means of transmitting information such as a telephone, smart phone, hardwired phone, videophone, or voice over IP phone.

Figure 2:
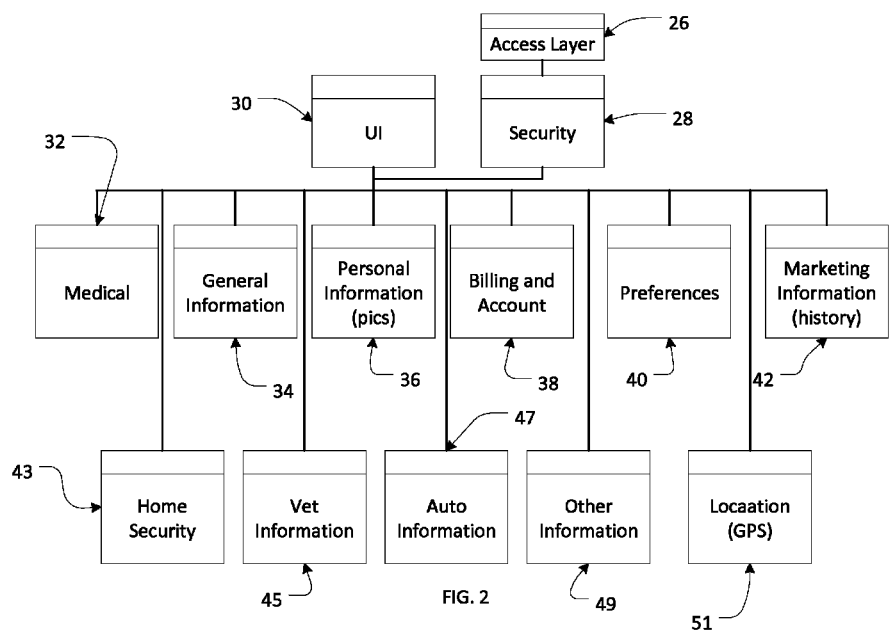
FIG. 2 is a schematic view of an information transmission device and system according to an aspect of the invention.

Referring now to FIG. 2, a software stack or schematic of server 20, according to one aspect of the present invention, is shown and described. Server 20 may be a cloud-based server or other computer system connected through a wireless network, such as Internet 18, or any hardwired network that communicates with caller 10 and caller 14. Likewise, server 20 may be replaced by storage and processing means located on either caller 10 or caller 14 such as through the memory or processing units in a smart phone. Server 20 may be multiple servers or one server or storage locations cloud or on-premise based.

In FIG. 2, server 20 generally includes connection layer 26 which provides an external connection such as an API, port, bridge code or other interface for which external computing systems may access server 20. It will be understood that server 20 includes memory storage, processing and other suitable features and peripherals. Security layer 28 provides security protocols to ensure that computer systems attempting access through connection layer 26 have the right security information or access credentials. Likewise, as will be discussed in greater detail, security layer 28 provides various levels of security with respect to which repositories (as will be discussed) will furnish what information in response to a server call from caller 10 or caller 14.

User interface or UI 30 provides an access layer to individuals who desire to access any of the aforementioned or to be discussed repositories or features of server 20. For example, UI 30 may include a login screen and a series of icons and other user interface features to adjust, store or modify the information retained in any of the repositories, security layer 28 or the layout of UI 30.

With continued reference to FIG. 2, server 20 includes a number of data repositories that may be accessed through a server call as will be described. The data repositories located in server 20 include, but are not limited to, medical information repository 32, general information repository 34, personal information repository 36, billing and account repository 38, preferences repository 40, historical information repository 42, home security repository 43, veterinary information repository 45, automobile information repository 47, and other information repository 49.

Medical information repository 32 may include various medical records of an individual such as historical diseases, medical allergies, medical insurance information, hospitals attended, primary care physician, storage of x-rays or MRIs or other similar types of medical information. General information repository 34 includes general information about a user such as the users name, address, phone number, email address or other information that is low sensitivity with respect to it being released to the public. Personal information repository 36 includes a number of personal preferences such as photographs, family information, links to favorite websites such as Facebook.com, Twitter or other personal type of information. Billing and account repository 38 includes financial information that may be useful to a vendor such as credit card number, billing address, shipping address, bank account numbers, investor information, brokers and brokerage accounts, PayPal accounts or other similar types of information. Preferences repository 40 includes personal preferences such as types of hotels desired, room characteristics such as smoking or non-smoking, aisle or window seat for air travel, favorite types of restaurants, vegetarian or vegan preferences, and other information that may be useful to an airline, hotel or other service for which a user may employ. Historical information repository 42 includes a tracking of places to which calls were made, purchases made, hotel stayed at and other information that may be beneficial to marketing firms or that may be otherwise used to establish trends or interest of a user. Home security repository 43 may include information such as alarm access codes, times away from home, vacation schedules or other similar information with respect to home security. Veterinary information repository 45 may include information with respect to the user's pet such as personal chip information, primary vet information, medication and other information similar to the medical information repository 32 except for a user's pet. Automobile information repository 47 may include information with respect to a user's vehicle such as mileage, auto service providers, oil change, fluids changed, tire rotation, and other similar features. Other information repository 49 may include other types of information that may be useful.

Figure 3:
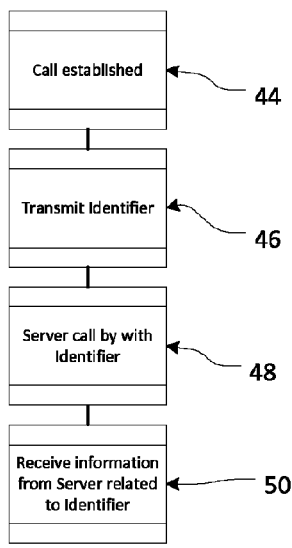
FIG. 3 is a flowchart depicting the operation of an information transmission device and system according to an aspect of the invention.

Referring now to FIG. 3, the process according to one aspect of the present invention is described. Prior to initiating the process of FIG. 3, a user inputs information into server 20 through computer 22. By way of example, a user accesses UI 30 from computer 22 and sets security parameters in security layer 28 and populates any one of a number of repositories with the information as previously discussed. To access the appropriate memory in server 20, such location may be associated with a domain name referencing caller identifier 12. For example, the memory location associate with caller 12 may be located at alan@1111-1111.com. In setting the security layer 28, the user may set certain types of access parameters that permit access to access layer 26 in response to a server call made thereto. For example, the security parameters may include general access to general information repository 34, restricted access to personal information repository 36 and medical information repository 32, while providing the most restrictive access to billing and account information repository 38. One skilled in the art will recognize that other security protocols may be employed through the use of security layer 28. By way of example, permission to retrieve information from general information repository 34 may be granted to any incoming server request while access to account information repository 38 may only be granted a caller 14 previously approved or on an authorized approval list or only if the server request is explicitly permitted by caller 10.

Referring now to FIG. 3, one example of a process starts with step 44 where a call was established from caller 10 to caller 14. Referring to FIG. 1, the call may be established by caller 10 initiating a call to caller 14 through dialing of the phone number of caller 14 or other known means. Such call may be initiated through any standard calling means including dialing or selection of a contact in a smart phone. The call may also be initiated or conducted through the sending of a text or an SMS message from caller 10 to caller 14 or vice versa. It will be understood that such call may be initiated through caller 14 initiating a call to caller 10. In the present example, in step 46, a caller identifier 12 is transmitted from caller 10 to caller 14. Such transmission may occur through any known means including use of a frequency shift key (FSK) to transmit the caller identifier 12 in conjunction with a voice message. One skilled in the art will recognize other means of transmitting caller identifier 12 to caller 14. In one embodiment, caller identifier 12 is the phone number associated with caller 10. In step 48, caller 14 receives the caller identifier 12 and sends it to computer 24. Computer 24, in turn, dispatches the caller identifier 12 through network connection 17, Internet 18 and to connection layer 26 of server 20. In one embodiment, the proper address in server 20 is associated with a domain ending with the caller identifier 12. For example, the domain associated with caller 10 might be Alan@111-1111.com where 111-1111 is both the phone number and caller identifier 12 associated with caller 10. In response thereto, server 20 dispatches information from any one of the aforementioned repositories depending on the settings of the security layer 28. In step 50, the information from the repositories in server 20 is dispatched from server 20, through Internet 18, through network connection 17 and to computer 24.

Figures 6, 7, 8:
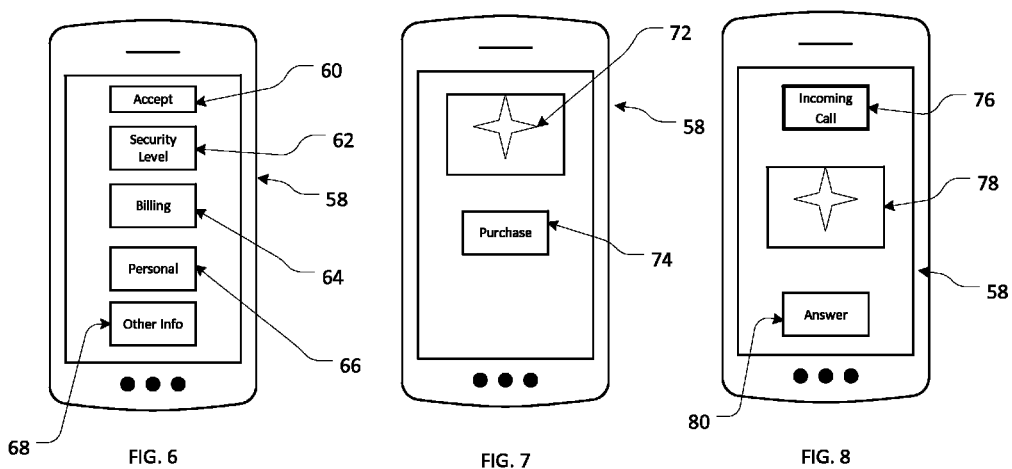
FIG. 6 is a schematic view of a user interface for an information transmission device and system according to an aspect of the invention.
FIG. 7 is a schematic view of a user interface for an information transmission device and system according to an aspect of the invention.
FIG. 8 is a schematic view of a user interface for an information transmission device and system according to an aspect of the invention.

In one nonlimiting practical example, caller 10 calls caller 14 in step 44. The phone number of caller 10, which is the caller identifier 12, is transmitted to caller 14 during the call. The phone number is then modulated by computer 24 and transmitted to server 20. Again, this may be conducted through using the domain associated with the caller identifier such as alan@111-1111. Security layer 28 receives the phone number, and possibly additional encryption information such as a public and private key pair, and accesses general information repository 34 including information such as the name, address and phone number of caller 10. This information is then sent back to computer 24. As a result, when receiving a call from caller 10, caller 14 immediately has the name, address and phone number of caller 10. In another example, caller 14, in response to a call from caller 10 and dispatching caller identifier 12 to server 20 may receive a picture of a user of caller 10 on their phone. As shown in FIG. 8, a smart phone 58 has incoming call message 76 indicating that a call is incoming and an answer button 80. With the incoming call and in connection with the aforementioned process of receiving information from server 20, image 78, which may be a picture selected by caller 10, is sent to caller 14 from server 20 and may appear as image 78 on the smart phone 58 of caller 14. As such, caller 10 may store a desired picture of themselves on server 20 which is then dispatched to caller 14 during a call. This is different than present technology which permits only the receiver or caller 14 to select the desired picture to be displayed on their phone in response to an incoming call. In another example, caller 14 may immediately receive medical information or home security information in the event that caller 10 is calling caller 14 for medical services or police respectively such as associated with a 911 call. Likewise, caller 14 may receive veterinary information from that information repository 45 in the event that caller 10 is calling with respect to an emergency for their pet to caller 14. Furthermore, in the event that caller 10 is contacting an airline, hotel or other similar service provider, caller 14 may have immediate access to preferences information from preferences repository 40 such that the airliner, restaurant or hotel immediately knows seating, dining or room preferences of caller 10.

Figure 4:
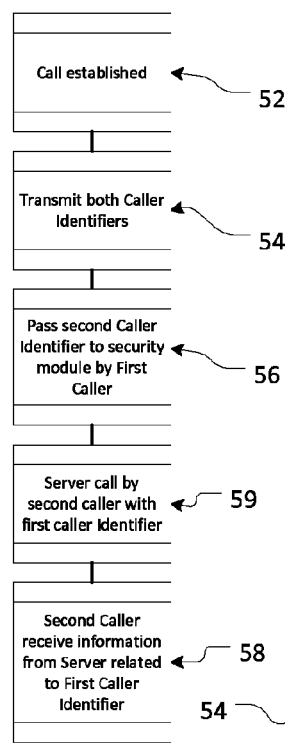
FIG. 4 is a flowchart depicting the operation of an information transmission device and system according to an aspect of the invention.
Figure 5:
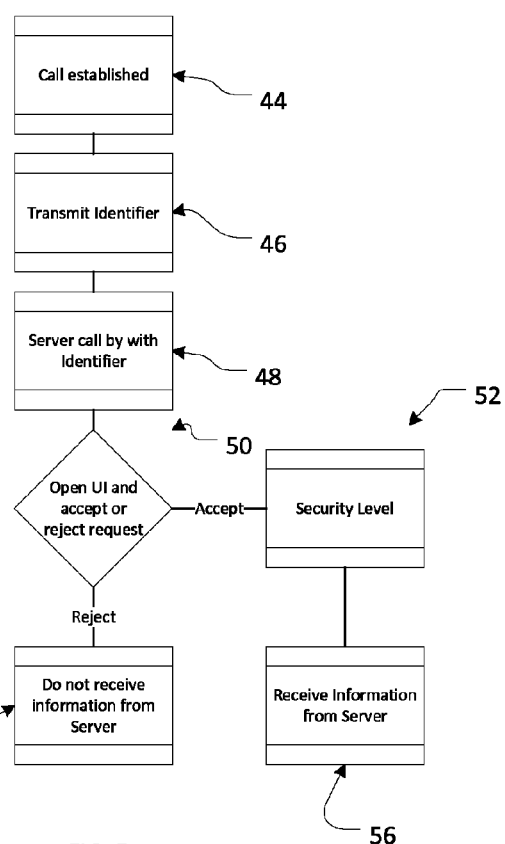
FIG. 5 is a flowchart depicting the operation of an information transmission device and system according to an aspect of the invention.

Referring to FIG. 4, another embodiment of the invention is shown and described. In FIG. 4, a call is established as in step 52 as previously discussed. In step 54, caller identifier 12 is dispatched from caller 10 to caller 14 as previously discussed. Additionally, caller identifier 13 is dispatched from caller 14 to caller 10. As discussed above, such personal identifier may be a telephone number associated with the respective caller. In step 56, caller 10 then dispatches the caller identifier 13 to server 20 through computer 22 and Internet 18 and network connection 16. The personal identifier 13 is used by server 22 initiate various functions on behalf of caller 10 as will be described.

In one example, the caller identifier 13 is passed to security layer 28 and security layer 28 uses the caller identifier 13 to permit only an entity associated with caller identifier 13 to access the various repositories. More specifically, in step 59, a server call is made to server 20 by computer 24 as discussed in step 48 of FIG. 3. However, in addition to providing personal identifier 12, computer 24 also provides personal identifier 13. In response thereto, in step 58, security layer 28 then looks to the personal identifier 13 received from caller 10 to see if it matches the personal identifier 13 provided by caller 14. Server 20 releases information from the aforementioned repositories to caller 14 associated with personal identifier 13. In this way, caller 10 is able to provide limited access to the repositories stored in server 20 only to caller 14 and no one else.

In another embodiment, the permission given to caller 14 to access the respective repositories is governed through an acceptance provided from caller 10. In FIG. 6, a smart phone 58 is shown having an accept button 60, security level button 62, billing button 64, personal button 66, and other info button 68. It will be understood that each of these buttons corresponds to the respective repository identified in FIG. 2. As such, in response to caller 10 receiving the caller identifier 13, caller 10 may be prompted by either server 24 or an application run by computer 22 to select the level of access to which caller 14 is permitted. More specifically, caller 10, upon receipt of caller identifier 12 and/or 13 as discussed in the previous examples, may select accept button 62 permit caller 14 to access information from any of the repositories. The security level button 62 may be used to customize access provided to caller 14 to the respective repositories. Billing button 64 may permit caller 14 to have access to billing information from the billing and account information repository 38. Personal button 66 may permit caller 14 to have access to the information in personal information repository 36. Other information button 68 may permit caller 14 to have access to any of the repositories including other information repository 49. One skilled in the art will recognize that access to other repositories may be similarly permitted.

In another example, caller 14 may immediately retrieve billing and account information from caller 10 in the event that caller 10 is attempting to place a purchase order with caller 14. For example, with reference to FIG. 7, a smart phone 58 is shown having a purchase button 74 and an image 72. In the present example, information provided from server 20 in connection with a call initiated by caller 10 to caller 14 includes product brochures or images 72. A user, such as caller 14, may select the purchase button 74 to purchase the item illustrated with image 72.

Figure 9:
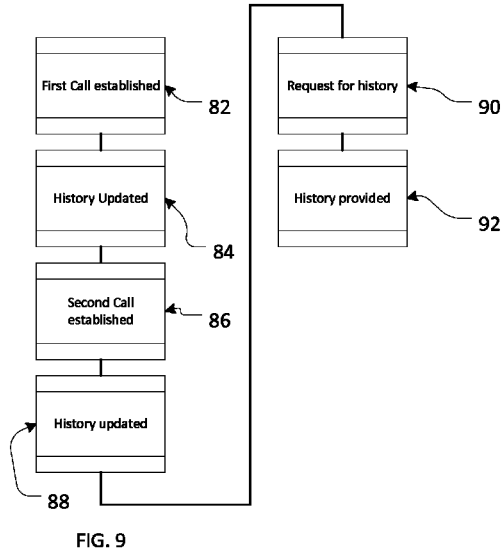
FIG. 9 is a flowchart depicting the operation of an information transmission device and system according to an aspect of the invention.

Referring now to FIG. 9, another embodiment of the present invention is shown and described. In FIG. 9, the process starts at step 82 where a first call is established between caller 10 and caller 14. In step 84, history repository 42 is updated based on the call. Here, caller 10 provides a server request from computer 22 to server 20 based on caller identifier 13 and receives information with respect to caller 14 from server 20. This information is then populated in history repository 42. For example, caller 10 may contact a hotel chain and in response thereto receive information with respect to the hotel chain such as types of goods or services the hotel provides or other information useful to a marketing or demographic firm. Likewise, if caller 10 initiates a purchase or otherwise undertakes some service with caller 14, that information is provided from computer 22 to server 20 and stored in repository 42. Such information may include, for example, hotel chains called, the type of room, location, smoking or non-smoking preference that caller 10 selected. In step 86 a second call is established with a different caller 14. The second caller 14 may be a completely different vendor, such as a bookstore or airline booking agency. In step 88, history repository 42 is updated similar to that as conducted in the previous steps.

As a result of the aforementioned process, history repository 42 contains a significant amount of personal information with respect to the purchase and other habits of caller 10. This information may be then sold, given or otherwise traded to a marketing firm or other company or individual that may be interested. Unlike websites or marketing firms the track this information presently, history repository 42 is in the possession of caller 10 and therefore may be disseminated under terms suitable to caller 10. Additionally, as it travels with that is personal to the caller 10, the contains much more accurate information than otherwise available.

Figure 11:
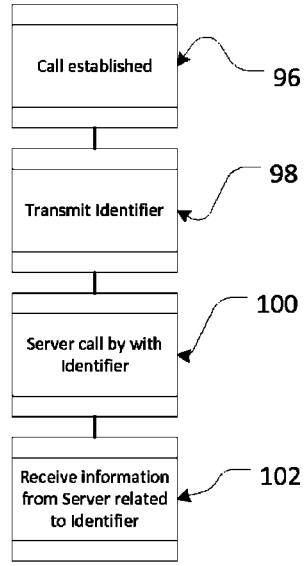
FIG. 11 is a flowchart depicting the operation of an information transmission device and system according to an aspect of the invention.
Figure 10:
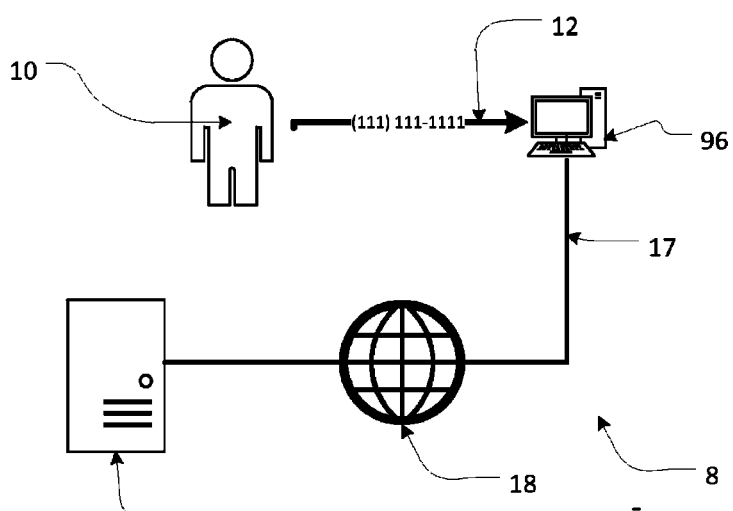
FIG. 10 is a schematic view of an information transmission device and system according to an aspect of the invention.

Referring now to FIG. 10, another embodiment of the invention is shown and described. In FIG. 10, caller 10 is an individual who is inputting personal identifier 12 into computer terminal 96. Such input may occur through caller 10 inputting the caller identifier into a user interface of a local terminal which is then transmitted through a network connection, such as the Internet, to a computer terminal control by caller 14. Referring to FIG. 11, in step 98, caller identifier 12 is then transmitted to server 20 through network connection 17 and Internet 18. In response thereto, in step 102, information from any of the aforementioned repositories is then sent back to computer terminal 96. By this way, a user can input their caller identifier 12 and the site in which they identifier is input may be updated with the information of caller 10.

In this specification, various preferred embodiments may have been described with reference to the accompanying drawings. It will, however, be evident that various modifications and changes may be made thereto, and additional embodiments may be implemented, without departing from the broader scope of the invention as set forth in the claims that follow. The present invention is thus not to be interpreted as being limited to particular embodiments and the specification and drawings are to be regarded in an illustrative rather than restrictive sense.

It will be appreciated that the system and methods described herein have broad applications. The foregoing embodiments were chosen and described in order to illustrate principles of the methods and apparatuses as well as some practical applications. The preceding description enables others skilled in the art to utilize methods and apparatuses in various embodiments and with various modifications as are suited to the particular use contemplated. In accordance with the provisions of the patent statutes, the principles and modes of operation of this invention have been explained and illustrated in exemplary embodiments.

It is intended that the scope of the present methods and apparatuses be defined by the following claims. However, it must be understood that this invention may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary. It is intended that the following claims define the scope of the invention and that the method and apparatus within the scope of these claims and their equivalents be covered thereby. In sum, it should be understood that the invention is capable of modification and variation and is limited only by the following claims.

What is claimed is:

1. A computer implemented method, comprising:
   making a phone call from a sender to a receiver;
   providing a non-audio identifier to the receiver in a phone call signal of the phone call;
   providing at least one button on a computer screen of the sender providing multiple levels of access to information; and
   providing access to the information to the receiver upon selection of the button by the sender;
   wherein the non-audio identifier provides access to the information of the sender by the receiver.

2. The computer implemented method according to claim 1, wherein the identifier is a phone number of the sender.

3. The computer implemented method according to claim 1, wherein the information is billing information.

4. The computer implemented method according to claim 1, wherein the non-audio identifier is a domain name associated with a phone number of the sender.

5. A computer implemented method, comprising:
   making a phone call from a sender to a receiver;
   providing a non-audio identifier to the sender from the receiver in a phone call signal of the phone call;
   providing a purchase button on a computer device of the sender; and
   sending a second non-audio identifier to the receiver from the sender in response to selection of the button;
   wherein the second-non-audio identifier permits the receiver to access second information from the sender;
   wherein the non-audio identifier provides access to information of the receiver by the sender.

6. The computer implemented method according to claim 5, wherein the identifier permits the receiver to access product purchase information of the sender.

7. The computer implemented method according to claim 6, wherein the second information is a billing information of the sender.

8. The computer implemented method according to claim 7, wherein the billing information is a credit card information of the sender.

9. The computer implemented method according to claim 1, wherein the information is an email address of the sender.

10. The computer implemented method according to claim 9, wherein the email address is a name of the sender followed by a phone number of the sender such as name@phonenumber.com.

* * * * *